US008428794B2

(12) United States Patent
Peterson

(10) Patent No.: US 8,428,794 B2
(45) Date of Patent: Apr. 23, 2013

(54) METHOD AND APPARATUS FOR MANAGING INSTRUMENT MISSED APPROACHES

(75) Inventor: Mark Alan Peterson, Mountlake Terrace, WA (US)

(73) Assignee: The Boeing Company, Chicago, IL (US)

( * ) Notice: Subject to any disclaimer, the term of this patent is extended or adjusted under 35 U.S.C. 154(b) by 1547 days.

(21) Appl. No.: 11/828,800

(22) Filed: Jul. 26, 2007

(65) Prior Publication Data

US 2009/0030564 A1 Jan. 29, 2009

(51) Int. Cl.

| | |
|---|---|
| ***G06F 17/00*** | (2006.01) |
| ***G06F 7/00*** | (2006.01) |
| ***B64C 19/00*** | (2006.01) |
| ***G08G 5/00*** | (2006.01) |
| ***G05D 1/00*** | (2006.01) |

(52) U.S. Cl.
USPC ............. 701/16; 701/411; 701/416; 701/423; 340/995.19; 244/76 R

(58) Field of Classification Search .................. 701/3, 4, 701/8, 9, 11, 120, 122, 300, 301, 1, 14, 16, 701/23, 400, 408, 409, 410, 411, 414, 416, 701/418, 423, 454, 466, 467, 468, 532, 533, 701/302; 340/945, 951, 961, 963, 988, 995.19, 340/995.21; 73/178 T, 178 R; 244/75.1, 244/175, 183, 196, 76 R
See application file for complete search history.

(56) References Cited

U.S. PATENT DOCUMENTS

| | | | | |
|---|---|---|---|---|
| 5,526,265 | A * | 6/1996 | Nakhla | 701/16 |
| 5,842,142 | A * | 11/1998 | Murray et al. | 701/16 |
| 6,438,469 | B1 | 8/2002 | Dwyer et al. | |
| 6,816,780 | B2 * | 11/2004 | Naimer et al. | 701/206 |
| 6,957,130 | B1 * | 10/2005 | Horvath et al. | 701/3 |
| 7,024,287 | B2 | 4/2006 | Peckham et al. | |
| 7,499,771 | B2 * | 3/2009 | Caillaud | 701/3 |
| 2003/0139877 | A1 * | 7/2003 | Dwyer | 701/206 |
| 2006/0214816 | A1 * | 9/2006 | Schell | 340/961 |
| 2006/0253232 | A1 * | 11/2006 | Gerrity et al. | 701/16 |
| 2007/0129855 | A1 | 6/2007 | Coulmeau | |
| 2007/0129857 | A1 * | 6/2007 | Fortier | 701/16 |

OTHER PUBLICATIONS

EP Extended Search Report for application EP08075571 dated Feb. 9, 2011.

* cited by examiner

*Primary Examiner* — Thomas Tarcza
*Assistant Examiner* — Edward Pipala
(74) *Attorney, Agent, or Firm* — Yee & Associates, P.C.

(57) ABSTRACT

A computer implemented method, apparatus, and computer usable program code for managing missed approaches to runways. In one advantageous embodiment, an event requiring missing an approach to a runway by an aircraft is monitored for, while the movement of the aircraft along a route is being controlled by a flight management system. Responsive to detecting the event, a location of the aircraft is identified to form an identified location. The identified location of the aircraft is compared to a plurality of waypoints for a plurality of missed approach routes to identify an active waypoint in the plurality of waypoints closest to the aircraft to form an identified waypoint. A missed approach route from the plurality of missed approach routes associated with the identified waypoint is executed for the aircraft.

21 Claims, 4 Drawing Sheets

METHOD AND APPARATUS FOR MANAGING INSTRUMENT MISSED APPROACHES

BACKGROUND INFORMATION

1. Field

The present disclosure relates generally to an improved data processing system and in particular to flight management. Still more particularly, the present disclosure relates to a computer implemented method, apparatus, and computer usable program code for managing missed approaches when an instrument approach cannot be completed to a landing.

2. Background

Flight management systems are found on most commercial and business aircraft and are used to assist pilots in navigation, flight planning, and aircraft control functions. This system may show a route programmed by a pilot, as well as other pertinent information from a database, such as standard departure and arrival procedures. This type of information may be combined with the location of an aircraft to create a moving map display.

During the flight of the aircraft and when approaching an airport to land, the flight management system may include an autopilot process that guides the aircraft without assistance from the pilot. These types of autopilot processes may divide a flight into various stages, such as, taxi, takeoff, climb, level, descent, approaching, and landing phases. Flight management systems may automate all of these flight phases except for taxiing and takeoff.

Currently, when using an autopilot process in a flight management system, approaches may be missed or aborted for various reasons. For example, a plane may be present on the runway on which the aircraft is to land. In another example, weather conditions may require aborting the approach until a later time or for the aircraft to travel to another airport. Current autopilot systems have a set mechanism for handling an aborted or missed approach to a runway. The aircraft always travels to the threshold or edge of the runway or a designated missed approach point and then changes path or course in the same manner, regardless of the altitude of the aircraft.

SUMMARY

The different advantageous embodiments provide a computer implemented method, apparatus, and computer usable program code for managing missed approaches to runways. In one advantageous embodiment, an event requiring missing an approach to a runway by an aircraft is monitored for while the movement of the aircraft along a route is being controlled by a flight management system. Responsive to detecting the event, a location of the aircraft is identified to form an identified location. The identified location of the aircraft is compared to a plurality of waypoints for a plurality of missed approach routes to identify an active waypoint in the plurality of waypoints closest to the aircraft to form an identified waypoint. A missed approach route from the plurality of missed approach routes associated with the identified waypoint is executed for the aircraft.

In another advantageous embodiment, a computer implemented method is used to manage missed approaches. Responsive to detecting a condition requiring missing an approach to a runway by an aircraft, a location of the aircraft is identified. A missed approach route is selected from a plurality of missed approach routes for the runaway based on the location of the aircraft to form a selected missed approach route. A route of the aircraft is changed using the selected missed approach route.

In yet another advantageous embodiment, a computer program product comprises a computer usable medium having computer usable program code for managing missed approaches to runways. The computer program product comprises computer usable program code for monitoring for an event requiring missing an approach to a runway by an aircraft while the movement of the aircraft along a route is being controlled by a flight management system. The computer program product also includes computer usable program code, responsive to detecting the event, for identifying a location of the aircraft to form an identified location. Computer usable program code is present for comparing the identified location of the aircraft to a plurality of waypoints for a plurality of missed approach routes to identify an active waypoint in the plurality of waypoints closest to the aircraft to form an identified waypoint. The computer program product also includes computer usable program code for executing a missed approach route from the plurality of missed approach routes associated with the identified waypoint for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
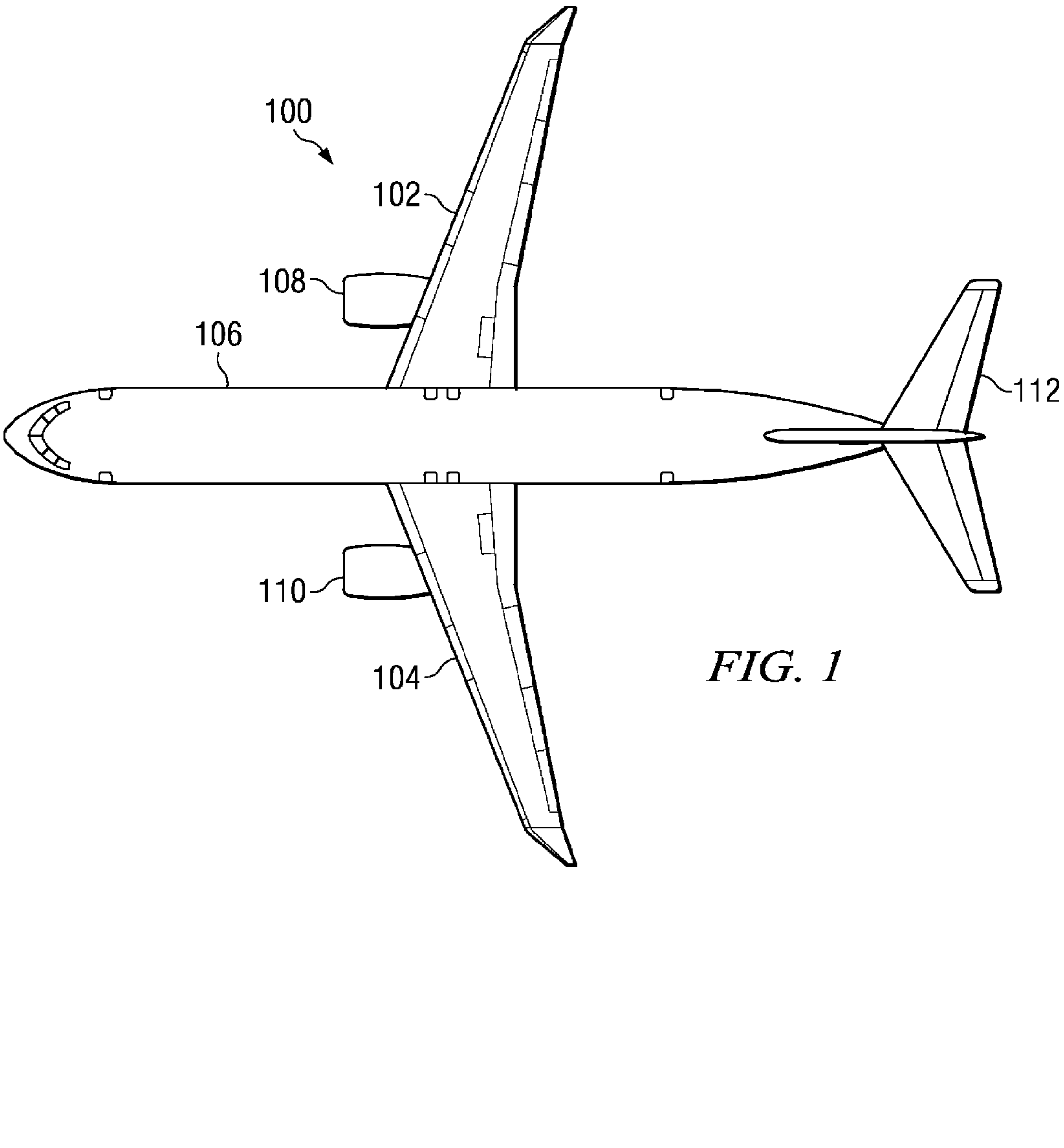
FIG. 1 is a diagram of an aircraft in which an advantageous embodiment may be implemented.

With reference now to the figures, and in particular, with reference to FIG. 1, a diagram of an aircraft is depicted in which an advantageous embodiment may be implemented. In this illustrative example, aircraft 100 has wings 102 and 104 attached to body 106. Aircraft 100 includes wing mounted engine 108, wing mounted engine 110, and tail 112. Aircraft 100 is an example of an aircraft in which processes for managing missed approaches may be implemented.

Figure 2:
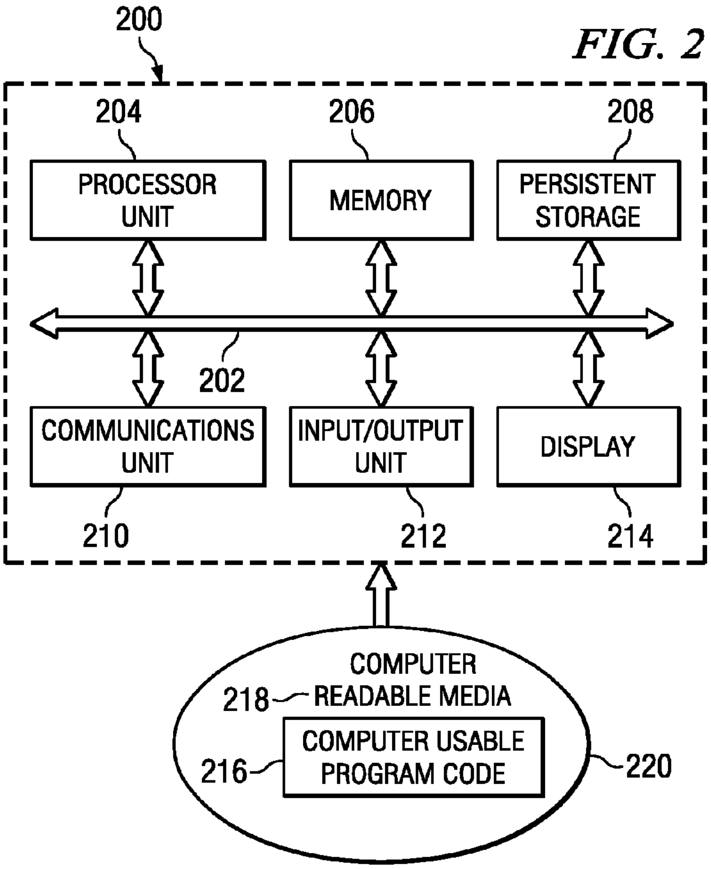
FIG. 2 is a diagram of a data processing system in accordance with an illustrative embodiment of the present invention.

Turning now to FIG. 2, a diagram of a data processing system is depicted in accordance with an illustrative embodiment of the present invention. Data processing system 200 is an example of a system that may be found in aircraft 100 in FIG. 1. Data processing system 200 is an example of a data processing system that may be used to implement a flight management system and autopilot processes for the flight management system.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204.

The computer readable program code may be embodied on different physical or tangible computer readable media, such as memory 206 or persistent storage 208.

Computer usable program code 216 is located in a functional form on computer readable media 218 and may be loaded onto or transferred to data processing system 200. Computer usable program code 216 and computer readable media 218 form computer program product 220 in these examples. In one example, computer readable media 218 may be, for example, an optical or magnetic disc that is inserted or placed into a drive or other device to that is part of persistent storage 208 for transfer onto a storage device, such as a hard drive that is part of persistent storage 208. Computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210, and/or through a connection to input/output unit 212. The communications link, and/or the connection, may be physical or wireless in the illustrative examples. The computer readable media also may take the form of non-tangible media, such as communications links or wireless transmission containing the computer readable program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The advantageous embodiments recognize that having different aircraft use the same procedure when a missed approach is initiated can result in increased congestion when multiple aircraft are present. For example, if an aircraft must abort an approach to a runway, traveling to the threshold of the runway and then taking a new path uses airspace for that runway that may be used by another aircraft that does not have to abort an approach. As a result, the second aircraft has to wait to use that particular runway. The different advantageous embodiments recognize that having all aircraft use the same track over a runway when an approach is aborted results in unneeded congestion. The different advantageous embodiments also recognize that with airspace capacity and terrain clearance at different airports, using a single missed approach path as currently used in flight management systems is not always an optimal solution.

The different advantageous embodiments provide a computer implemented method, apparatus, and computer usable program code for managing missed approaches. In these advantageous embodiments, in response to detecting a condition requiring missing an approach to a runway by an aircraft, a location of the aircraft is identified. A missed approach route is selected from the missed approach routes for the runway based on the location of the aircraft to form a selected missed approach route. The route of the aircraft is then changed using the selected missed approach route. In using or executing the missed approach route, the autopilot process on the aircraft follows the route set out for the particular missed approach to the runway.

Figure 3:
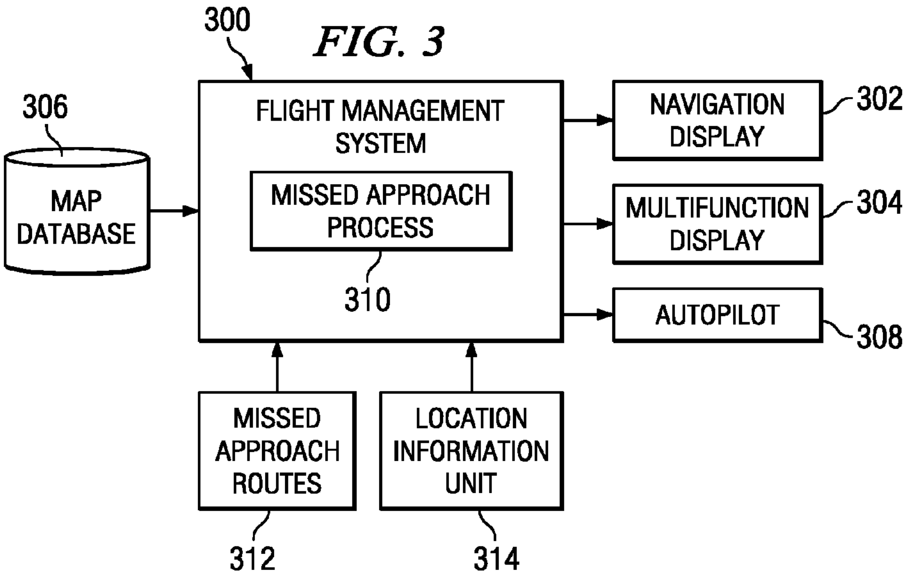
FIG. 3 is a diagram illustrating components used for managing missed approaches is depicted in accordance with an advantageous embodiment.

Turning now to FIG. 3, a diagram illustrating components used for managing missed approaches is depicted in accordance with an advantageous embodiment. In this example, flight management system 300 is an example of a flight management system that may be implemented in a data processing system, such as data processing system 200 in FIG. 2. In particular, flight management system 300, in these examples, is a software system or application. Flight management system 300 provides information to pilots, as well as providing auto flight processes to guide an aircraft without assistance from a pilot or its crew.

In this example, autopilot 308 is the component that provides the guidance to the aircraft without assistance from a pilot. In these examples, autopilot 308 may automate flight phases, such as, climb, level, descent, approach, and landing. Autopilot 308 reads the current position of the aircraft and controls a flight control system (not shown) used to guide the aircraft rather than having the pilot control the flight control system.

In these examples, flight management system 300 may provide a presentation of navigation information through navigation display 302 and multifunction display 304. In these examples, navigation display 302 may display information, such as altitude, airspeed, vertical speed, and other measurements pertaining to the flight of the aircraft. Multifunction display 304 may present information to a pilot in numerous configurable ways. For example, multifunction display 304 may provide a display of an airport using a moving map function or application.

Information regarding airports and routes may be found in map database 306. Map database 306 may be a local database within the aircraft in which flight management system 300 is located. Alternatively, map database 306 may be a remote database accessed by flight management system 300 through a communications link, such as a wireless communications link. Alternatively, map database 306 may contain information that is accessed from a local source and a remote source.

In these examples, missed approach process 310 is included as part of autopilot 308. This process is used to select an alternative route when an approach to a runway is to be missed for some event. In these examples, a missed approach refers to an instrument approach that has been missed. In other words, the instrument approach is one that is controlled by a system or function, such as autopilot 308, rather than by the pilot. In these examples, an approach is a series of predetermined maneuvers for the orderly transfer of an aircraft under instrument flight conditions from the beginning of the initial approach to a landing or to a point from which a landing may be made visually or the missed approach procedure is initiated.

The event may be, for example, an aircraft is present on the runway or weather may not permit using the particular runway. In the advantageous embodiments, missed approach process 310 allows for a selection of a particular missed approach route from a plurality of missed routes. In other words, more than one missed approach route may be selected.

In these examples, missed approach process 310 selects a missed approach route from missed approach routes 312. Missed approach routes 312 contain multiple missed approach routes for some approaches at different airports. With multiple missed approach routes, multiple aircraft may miss approaches using different missed approach routes in a manner that reduces congestion at an airport. This information may be stored on the aircraft in a separate database or may be part of map database 306. Missed approach routes 312 may be updated from time to time.

When a condition is detected that requires a missed approach to occur, missed approach process 310 obtains the location of the aircraft. The condition may be identified through a communication received from an air traffic control tower or other authority, indicating that a situation is present in which a landing on a runway needs to be aborted. The situation may be, for example, an aircraft or vehicle being present on the runway or weather conditions that may not permit using the particular runway.

In these examples, the location of the aircraft is obtained through location information unit 314. Location information unit 314 may take different forms, depending on the particular implementation. For example, location information unit 314 may be a global positioning system (GPS) unit that provides global positioning system data to missed approach process 310 within flight management system 300. Alternatively, location information unit 314 may be an internal guidance system on the aircraft. Of course, other types of information units may be implemented, depending on the particular embodiment.

After identifying the location of the aircraft, missed approach process 310 identifies the runway on which the aircraft was to land. Missed approach process 310 then identifies waypoints associated with that runway. These waypoints are the points at which the missed approach routes are to be initiated. The different waypoints are associated with different missed approach routes that may be taken for the runway/instrument approach.

Missed approach process 310 identifies or selects a missed approach route from the different missed approach routes for the runway. In these examples, the candidates for a missed approach route for use by the aircraft is one for which a waypoint has not yet been passed by the aircraft in its approach to the runway. The waypoints may be at different distances prior to the runway.

Depending on the particular implementation, missed approach process 310 may select the nearest waypoint to the aircraft that has not yet been passed by the aircraft. Depending on the particular implementation, the waypoint also may include an altitude that is used in determining whether the waypoint has been missed.

For example, if the waypoint is set at 2,000 feet and the aircraft is at 1,900 feet, the aircraft has passed that waypoint. That waypoint is not considered an active waypoint and the missed approach route associated with that waypoint cannot be taken. As another example, if the aircraft is five miles out from the runway and the waypoints are at four miles and one mile, the aircraft has not passed any of the waypoints for the missed approach routes. Both of these waypoints are active waypoints with missed approach routes that may be used. In this example, either missed approach route may be selected.

In these examples, however, the waypoint that is closest to the aircraft is selected to move the aircraft out of the airspace more quickly. As a default or last resort, the currently used missed approach route, based on the threshold or edge or the runway, may be used. In this manner, aircraft may be separated more quickly when, for example, a weather condition may require multiple aircraft that are scheduled to use the same runway to miss the approach to the runway.

Figure 4:
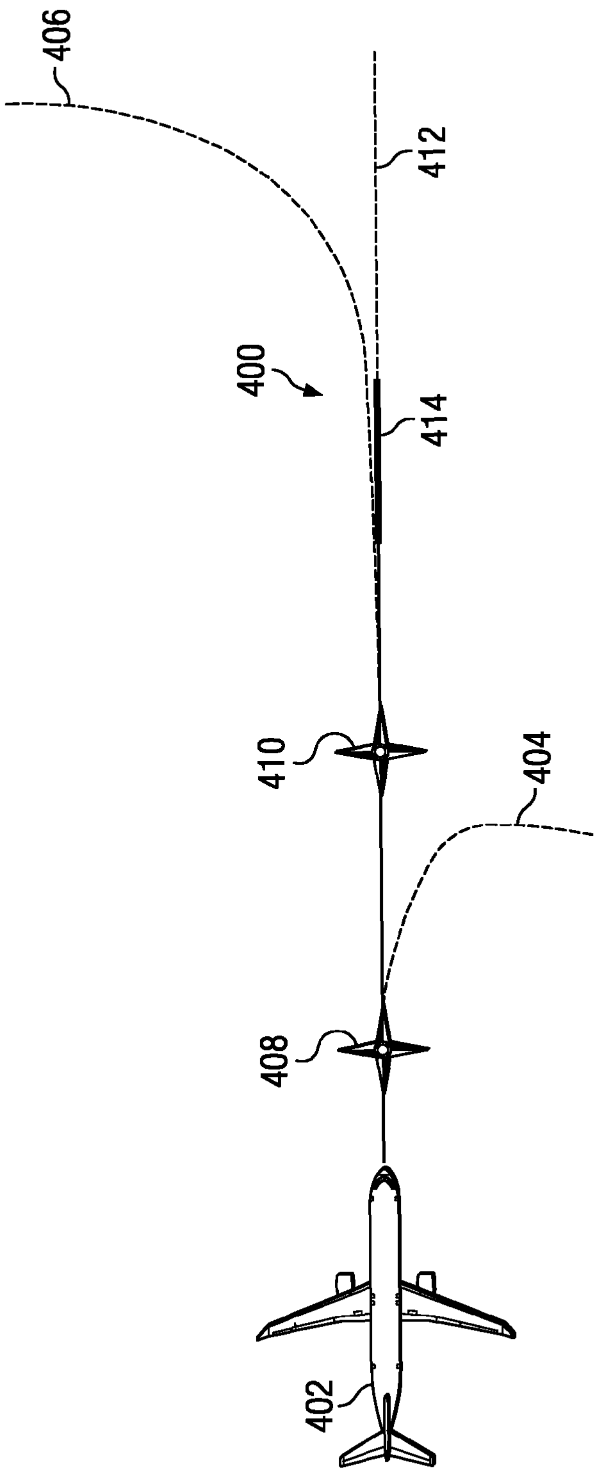
FIG. 4 is a diagram illustrating waypoints and missed approach routes in accordance with an advantageous embodiment.

Turning now to FIG. 4, a diagram illustrating waypoints and missed approach routes is depicted in accordance with an advantageous embodiment. In this particular example, runway 400 is located at an airport at which aircraft 402 is approaching for a landing. If aircraft 402 encounters a condition requiring a missed approach to runway 400, then one of missed approach routes 404 and 406 may be selected. The condition may arise based on communication with an air traffic control tower. The pilot may initiate an abort or missed approach to the landing. Alternatively, the autopilot process in aircraft 402 may initiate the missed approach to the runway, depending on the particular implementation.

In these examples, aircraft 402 has not yet passed waypoints 408 and 410. Waypoints that have not been passed are also referred to as active waypoints. As a result, waypoints 408 and 410 are active waypoints because they remain unpassed by aircraft 402. In this example, the autopilot process in aircraft 402 selects missed approach route 404 because waypoint 408 is closest to aircraft 402 and is unpassed by aircraft 402. Of course, depending on the particular implementation, route 406 may be selected by a process such as, missed approach process 310 in FIG. 3. If both waypoint 408 and waypoint 410 have been passed, missed approach route 412 may be taken.

In these examples, missed approach route 412 is a normal missed approach route normally taken with the aircraft flying across threshold 414 of runway 400. The diagram illustrated in FIG. 4 also may be presented to a user on multifunction display 304 in FIG. 3. In this type of implementation, a user may see missed approach route 404, missed approach route 406, and missed approached route 412. A user input may be entered to select one of the missed approach routes for use.

Figure 5:
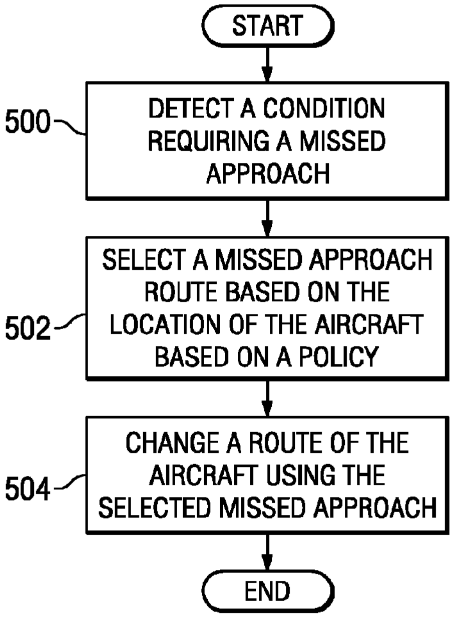
FIG. 5 is a flowchart of a process for managing missed approaches accordance with an advantageous embodiment.

Turning now to FIG. 5, a flowchart of a process for managing missed approaches is depicted in accordance with an advantageous embodiment. The process illustrated in FIG. 5 may be implemented in a flight management system, such as flight management system 300 in FIG. 3. In particular, this process may be implemented as part of missed approach process 310 in FIG. 3.

The process begins by detecting a condition requiring a missed approach (operation 500). In operation 500, the condition may be a communication received by the pilot indicating that the approach to the runway is to be missed or aborted. Alternatively, the condition may occur based on a transmission of information or data to an autopilot system. User intervention may be required to initiate the missed approach route process in FIG. 5. In other implementations, the autopilot process may automatically initiate this process.

Thereafter, a missed approach route is selected based on the location of the aircraft based on a policy (operation 502). A route of the aircraft is then changed using the selected missed approach (operation 504) with the process terminating thereafter.

Figure 6:
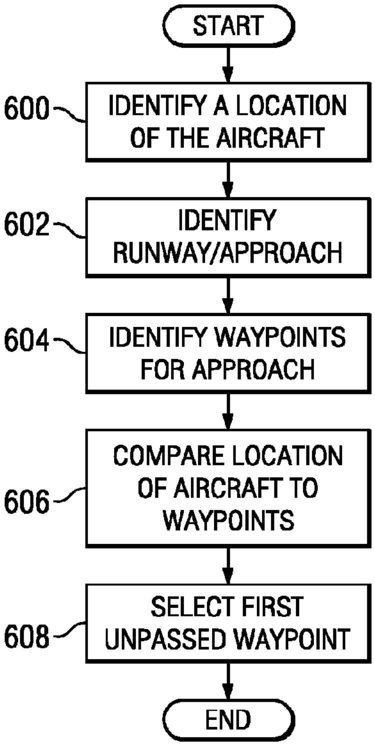
FIG. 6 is a flowchart of a process for selecting a missed approach route based on a location of the aircraft in accordance with an advantageous embodiment.

Turning now to FIG. 6, a flowchart of a process for selecting a missed approach route based on a location of the aircraft is depicted in accordance with an advantageous embodiment. The process illustrated in FIG. 6, in these examples, is a more detailed description of operation 502 in FIG. 5.

The process begins by identifying a location of the aircraft (operation 600). Thereafter, a runway for which the aircraft is to use is identified (operation 602). The process then identifies waypoints of the desired approach for the runway (operation 604). These waypoints are waypoints associated with missed approach routes. In particular, these waypoints represent the point at which an aircraft is to begin executing a particular missed approach route.

Then, the location of the aircraft is compared to the waypoints (operation 606). Operation 606 is used to identify active or unpassed waypoints, in these examples. The process selects the first unpassed waypoint (operation 608) with the process terminating thereafter.

Figure 7:
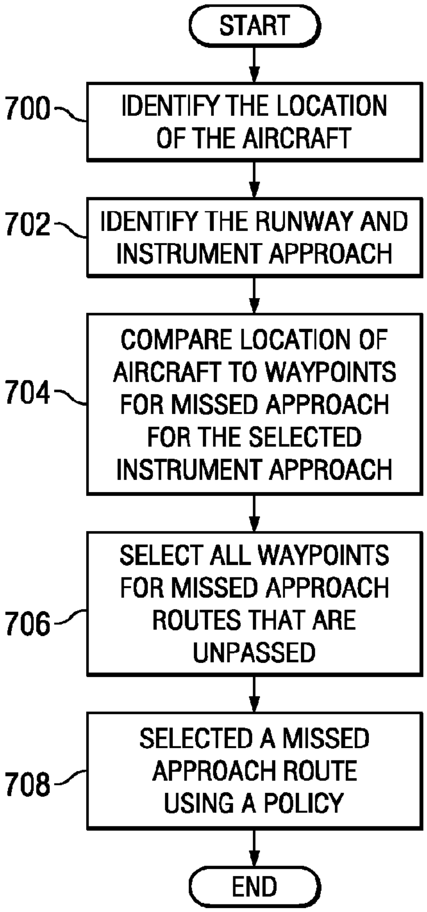
FIG. 7 is a flowchart of a process for selecting a missed approach route from multiple missed approach routes in accordance with an advantageous embodiment.

Turning now to FIG. 7, a flowchart of a process for selecting a missed approach route from multiple missed approach routes is depicted in accordance with an advantageous embodiment. The process illustrated in FIG. 7 is a more detailed description of operation 502 in FIG. 5, in these examples. This process shows yet another advantageous embodiment for selecting a missed approach route from multiple missed approach routes.

The process begins by identifying the location of the aircraft (operation 700). Thereafter, the runway is identified (operation 702). The location of the aircraft is compared to the waypoints for missed approach routes for the runway (operation 704).

The process then selects all waypoints for missed approach routes that are unpassed by the aircraft (operation 706). A missed approach route is selected using a policy (operation 708) with the process terminating thereafter.

The policy may be, for example, selecting the first unpassed missed approach route based on the waypoints for those missed approach routes. Alternatively, the policy may present the user with choices for all unpassed missed approach routes and allow the user to select one. Of course, the policy may include other rules or conditions, such as identifying the particular missed approach route to take, based on weather conditions. In another example, the policy may select a particular missed approach route, depending on whether the aircraft has an engine that is out or not working.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for managing missed approaches to runways. In response to detecting a condition requiring a missed approach to a runway by an aircraft, a location of the aircraft is identified. A missed approach route is then selected from a plurality of missed approach routes for the runway based on the location of the aircraft to form a selected missed approach route. The route of the aircraft is then changed using the selected missed approach route. In this manner, increased airport traffic capacity may be provided by allowing quicker separation of aircraft that have initiated a missed approach.

In this manner, the different advantageous embodiments may allows actions to be taken by pilots and/or flight control systems, auto pilot systems, and other processes or devices to manage missed approaches in a more efficient manner. The different embodiments reduce congestion by providing a pilot or process more routes to use when an approach is missed.

The description of the different advantageous embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing missed approaches to runways, the computer implemented method comprising:

monitoring for an event requiring missing an approach to a runway by an aircraft while a movement of the aircraft along a route is being controlled by a flight management system;

responsive to detecting the event, identifying a location of the aircraft to form an identified location and identifying the runway on which the aircraft was to land;

responsive to identifying the runway on which the aircraft was to land, identifying a plurality of waypoints associated with that runway, wherein each waypoint is associated with a particular missed approach route in a plurality of missed approach routes that may be taken for an approach to the runway;

comparing the identified location of the aircraft to the plurality of waypoints for the plurality of missed approach routes to identify an active waypoint in the plurality of waypoints closest to the aircraft to form an identified waypoint; and executing a missed approach route from the plurality of missed approach routes associated with the identified waypoint for the aircraft.

2. The computer implemented method of claim 1, wherein the monitoring step comprises:

monitoring for the event requiring missing the approach to a runway by the aircraft while the movement of the aircraft along the route is being controlled by the flight management system, wherein the event is one of a presence of another aircraft on the runway.

3. The computer implemented method of claim 1, wherein the comparing step comprises:

locating the active waypoint as a particular waypoint closest to the aircraft that the aircraft has not passed.

4. The computer implemented method of claim 3, wherein the locating step comprises:

locating the active waypoint as a waypoint closest to the aircraft that the aircraft has not passed in terms of both distance and altitude while traveling along the route.

5. The computer implemented method of claim 1, wherein the executing step comprises:

executing the missed approach route from the plurality of missed approach routes associated with the identified waypoint for the aircraft, wherein the missed approach route causes the aircraft to turn before reaching a threshold of the runway.

6. The computer implemented method of claim 1 further comprising:

displaying the plurality of missed approach routes on a display in the aircraft.

7. The computer implemented method of claim 1 further comprising:

receiving updates to the plurality of missed approach routes.

8. A computer implemented method for managing missed approaches, the computer implemented method comprising:

responsive to detecting a condition requiring missing an approach to a runway on which the aircraft was to land by an aircraft, identifying a location of the aircraft and identifying the runway on which the aircraft was to land;

responsive to identifying the runway on which the aircraft was to land, identifying a plurality of waypoints associated with that runway, wherein each waypoint is associated with a particular missed approach route in a plurality of missed approach routes that may be taken for an approach to the runway;

selecting a missed approach route from the plurality of missed approach routes for the runaway based on the location of the aircraft and the runway on which the aircraft was to land to form a selected missed approach route; and changing a route of the aircraft using the selected missed approach route.

9. The computer implemented method of claim 8, wherein the selecting step comprises:

identifying a set of missed approach routes from the plurality of missed approach routes for the runway based on the location of the aircraft; and requesting user input to selected a missed approach route from the set of missed approach routes.

10. The computer implemented method of claim 8, wherein the selecting step comprises:

identifying a set of missed approach routes from the plurality of missed approach routes for the runway based on the location of the aircraft; and choosing the selected missed approach route using a policy.

11. The computer implemented method of claim 8, wherein the selecting step comprises:

identifying a set of waypoints associated with the plurality of missed approach routes from a plurality of waypoints that remain unpassed by the aircraft, wherein a set of missed approach routes are associated with the set of waypoints; and choosing the selected missed approach route from the set of missed approach routes using a policy.

12. The computer implemented method of claim 11, wherein the step of choosing the selected missed approach route from the set of missed approach routes using a policy comprises:

presenting the set of missed approach routes on a display in the aircraft; and receiving a user input selecting the selected missed approach route.

13. The computer implemented method of claim 11, wherein the choosing step comprises:

choosing the selected missed approach route from the set of missed approach routes using the policy, wherein the policy considers whether an engine is out on the aircraft.

14. The computer implemented method of claim 8 further comprising:

periodically receiving an update of the missed approach routes for the runway.

15. The computer implemented method of claim 8, wherein the step of selecting the missed approach route from the plurality of missed approach routes for the runway based on the location of the aircraft and the runway to form the selected missed approach route comprises:

comparing the location of the aircraft and the runway to a plurality of waypoints for the plurality of missed approach routes to identify an active waypoint in the plurality of waypoints closest to the aircraft to form an identified waypoint; and identifying the missed approach route associated with the active waypoint to form the selected missed approach route.

16. A computer program product comprising:

a non-transient computer readable medium having computer readable program code for managing missed approaches to runways, the computer program product comprising:

computer readable program code for monitoring for an event requiring missing an approach to a runway by an aircraft while a movement of the aircraft along a route is being controlled by a flight management system;

computer readable program code, responsive to detecting the event, for identifying a location of the aircraft to form an identified location and identifying the runway on which the aircraft was to land;

computer readable program code, responsive to identifying the runway on which the aircraft was to land, identifying a plurality of waypoints associated with that runway, wherein each waypoint is associated with a particular missed approach route in a plurality of missed approach routes that may be taken for an approach to the runway;

computer readable program code for comparing the identified location of the aircraft to the plurality of waypoints for the plurality of missed approach routes to identify an active waypoint in the plurality of waypoints closest to the aircraft to form an identified waypoint; and computer readable program code for executing a missed approach route from the plurality of missed approach routes associated with the identified waypoint for the aircraft.

17. The computer program product of claim 16, wherein the computer readable program code for monitoring for an event requiring missing an approach to a runway by an aircraft while the movement of the aircraft along a route is being controlled by a flight management system comprises:

computer readable program code for monitoring for the event requiring missing the approach to the runway by the aircraft while the movement of the aircraft along the route is being controlled by the flight management system, wherein the event is one of a presence of another aircraft on the runway.

18. The computer program product of claim 16, wherein the computer readable program code for comparing the identified location of the aircraft to a plurality of waypoints to identify an active waypoint in the plurality of waypoints to form an identified waypoint comprises:

computer readable program code for locating the active waypoint as a waypoint closest to the aircraft that the aircraft has not passed while traveling along the route.

19. The computer program product of claim 18, wherein the computer readable program code for locating the active waypoint as a particular waypoint closest to the aircraft that the aircraft has not passed while traveling along the route comprises:

computer readable program code for locating the active waypoint as the waypoint closest to the aircraft that the aircraft has not passed in terms of both distance and altitude while traveling along the route.

20. The computer program product of claim 16, wherein the computer readable program code for executing a missed approach route associated with the identified waypoint for the aircraft comprises:

computer readable program code for executing the missed approach route associated with the identified waypoint for the aircraft, wherein the missed approach route causes the aircraft to turn before reaching a threshold of the runway.

21. The computer program product of claim 16 further comprising:

computer readable program code for displaying the plurality of missed approach routes on a display in the aircraft.

* * * * *